April 10, 1928.  E. E. PINKERTON  1,665,420
EGG HOLDER
Filed March 21, 1927   2 Sheets-Sheet 1

INVENTOR
E. E. PINKERTON
BY
ATTORNEYS

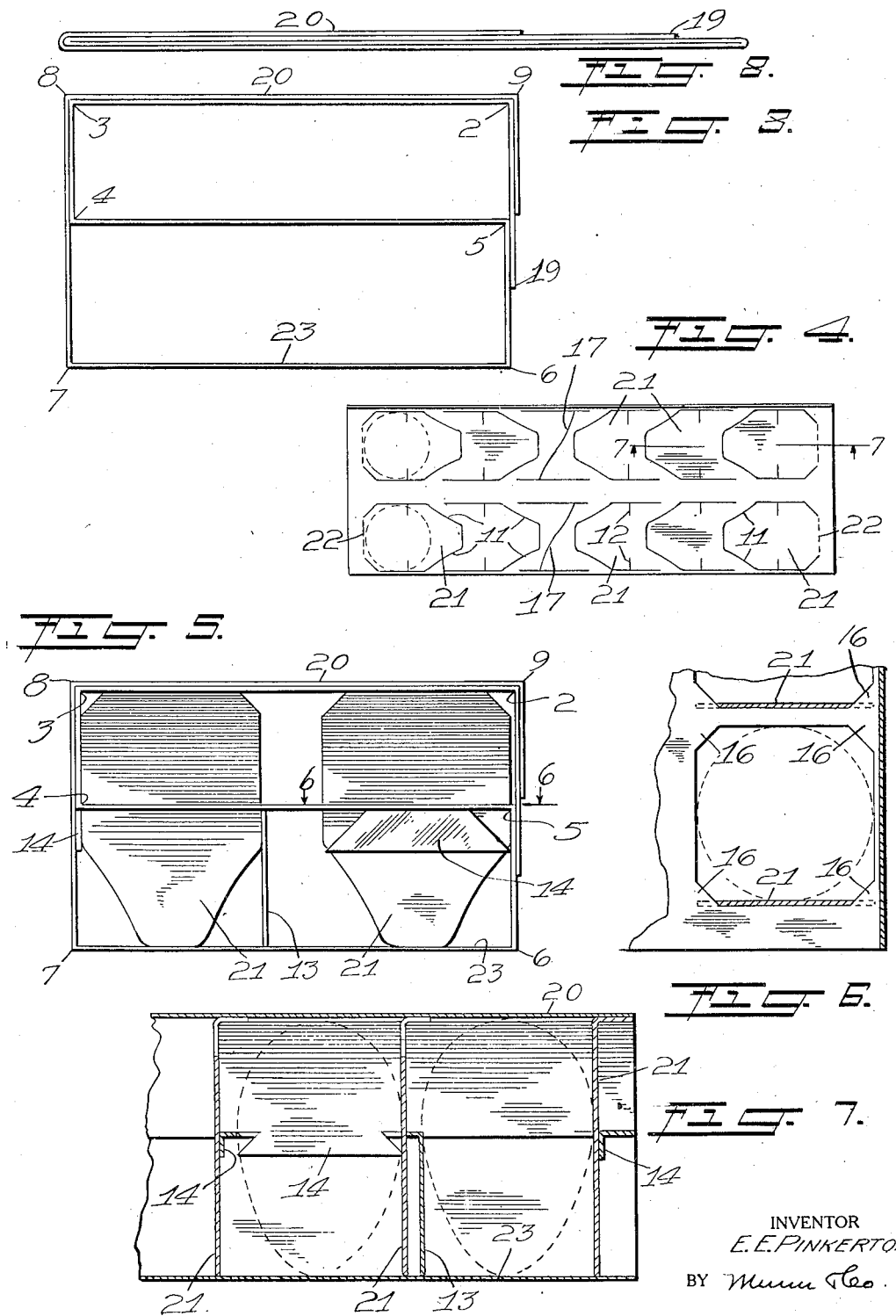

Patented Apr. 10, 1928.

1,665,420

UNITED STATES PATENT OFFICE.

EDWARD ELLSWORTH PINKERTON, OF CHICAGO, ILLINOIS, ASSIGNOR TO MARY A. PINKERTON, OF CHICAGO, ILLINOIS.

EGG HOLDER.

Application filed March 21, 1927. Serial No. 177,109.

My invention relates to improvements in egg holders and carriers for transporting eggs, and it consists in the combinations, constructions, and arrangements herein described and claimed.

An object of my invention is to provide an egg holder which can be economically manufactured, being stamped out of a single piece of pasteboard or cardboard, and which is provided with means for holding the egg at the central portion thereof as well as at the top and bottom, this means consisting of a pair of sheets having parts struck therefrom in such relation as to hold the egg securely when the latter is thrust into the opening made by the punched portions.

A further object of my invention is to provide a box in which the inner structure when certain cut portions are bent inwardly by the placing of the egg in the box will serve to brace the box both longitudinally and transversely, thus further insuring against breakage.

A further object is to provide a box of the type described, in which the eggs are received in cells having spring members arranged to hold the egg in position, certain of these spring members having slots arranged to be received in brace members so as to further insure the strength of the structure.

A further object of the invention is to provide a device of the type described which may be shipped flat and which may be instantly brought into position to receive the eggs by pressure exerted on the opposite sides of the box.

Other objects and advantages will appear in the following specification, and the novel features of the invention will be particularly pointed out in the appended claims.

Figure 1:
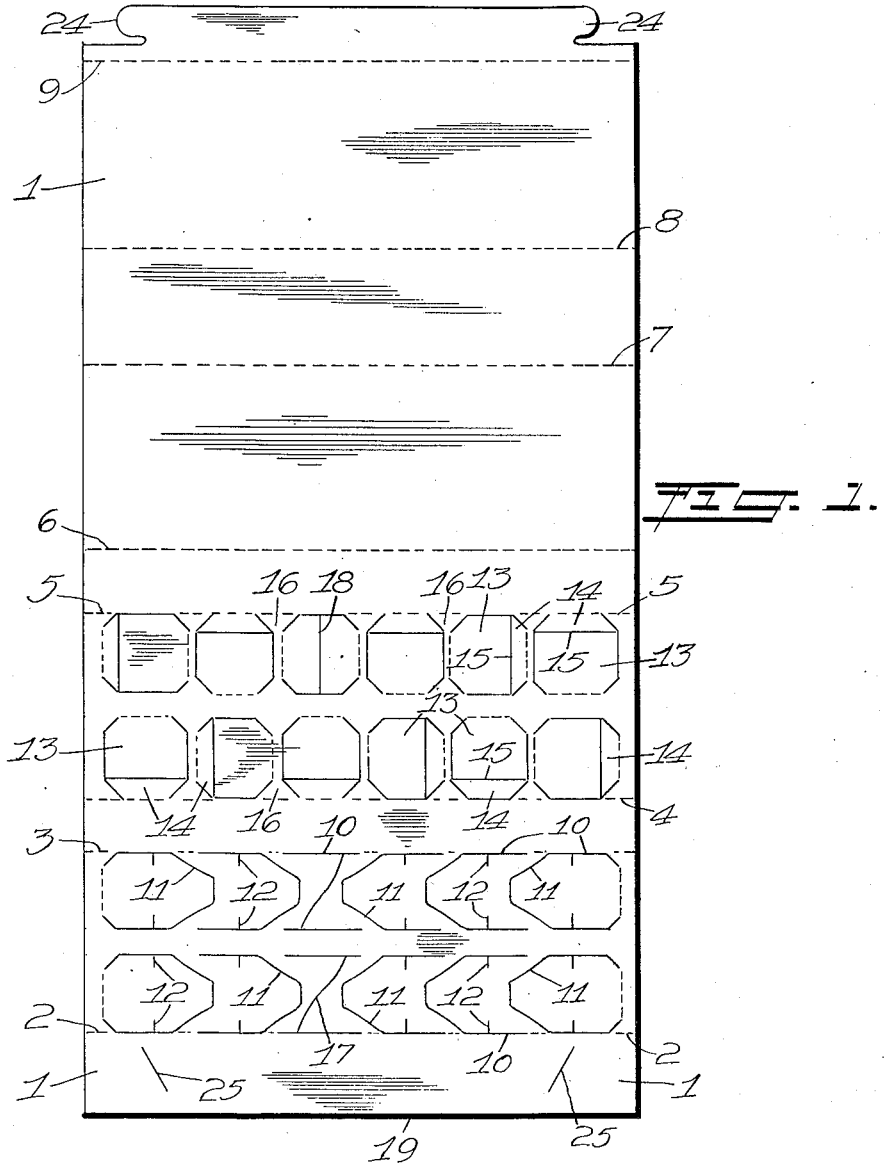
Figure 2:

My invention is illustrated in the accompanying drawings, forming part of this application, in which Figure 1 is a plan view of a punched blank from which the holder is made, Figure 2 is a side elevation of the holder, showing the latter in its closed position, Figure 3 is an end elevation of the holder before the eggs have been placed therein, Figure 4 is a top plan view of the holder with the cover raised before the eggs have been placed therein, Figure 5 is an end elevation similar to Figure 3, but showing the positions of the parts after the eggs have been placed in the holder, Figure 6 is a sectional view on the line 6—6 of Figure 5, Fig. 7 is an enlarged sectional view on the line 7—7 of Figure 4, the eggs being shown in dotted lines and Figure 8 is an end view of the box in its collapsed condition, ready for shipment.

In carrying out my invention, I make use of a substantially rectangular sheet of cardboard 1 having scored lines for folding the rectangular sheet, these lines being shown at 2, 3, 4, 5, 6, 7, 8 and 9, respectively, from bottom to top in Figure 1. It will be noted that these lines are in parallel relation. Near the bottom of the sheet 1 shown in Figure 1, I arrange parallel rows of slits of the shape shown in the figure. It will be observed that there are slits 10 which are parallel to the folding lines and slits 11 connecting parallel slits 10 so as to form tongues, which, as will be afterwards described, may be bent downwardly. The tongues toward one end of each row are directed toward the tongues of the opposite end of the row and each tongue is provided with inwardly extending slits 12 from opposite sides thereof, the purpose of which will be explained later.

Further up on the sheet, shown in Figure 1, are other parallel rows of slits. These slits are so arranged that two tongues will be pushed aside for each egg inserted, a large tongue such as shown at 13 and a smaller one, shown at 14. It will be observed that these tongues 13 and 14 are arranged to extend in different directions and are bent down from folding lines which extend in different directions. Thus, as will be seen in Figure 1, the tongues at the right-hand end of the lower row bend from vertically extending folding lines, while the tongues immediately above bend downwardly from horizontally disposed folding lines in Figure 1. This arrangement also is followed out in the adjacent tongues of the same row and it will be observed that the slits 15 between the two tongues of any set are disposed at right angles to each other in adjacent sets and in the different sets may be parallel with the horizontal folding lines or the vertical folding lines. The tongues 13 have near their folding lines diagonal slits to leave triangular-shaped braces 16.

It will be noted that in the two lower rows in Figure 1 are curved slits 17, while in one of the upper rows there is a slit 18 which provides two tongues of substantially the same size.

With the slits cut as described, the lower part of the sheet shown in Figure 1 is now folded upwardly at right angles to the plane of the paper on the folding line 6, see Figure 3, and then is folded at right angles along the line 5. This will bring the lower and upper parts of the sheet shown in Figure 1 into parallel relation, with the lower part above the upper part. The lower part is now folded along the line 4 in the reverse direction at right angles, see Figure 3, and then again on line 3 in the reverse direction, see Figure 3, and then again at line 2. The lower edge 19 is then brought down to that part between the folds 5 and 6 and is glued or otherwise cemented, as shown in Figure 3. The upper part of the sheet is folded upwardly at 7, see Figure 3, then at 8 and at 9. That portion between the folding lines 3 and 4 is glued or cemented to the adjacent portion between the folding lines 7 and 8. The carrier is then ready for use.

In folding the sheet in the manner described, a carrier will be formed having two sheets with slits forming tongues which may be pushed aside when the eggs are thrust through the upper sheet, these tongues being arranged in sets, as shown in the drawing. The holder, when the cover portion 20 is raised, has the appearance shown in Figure 4. Consider the action when an egg is thrust downwardly on the lower left-hand tongue 21 in Figure 4. This tongue will bend downwardly from the folding line 22 and the egg in its further descent will strike the tongues 13 and 14 and push them aside, and the braces 16 will enter the slits 12, thus tending to brace the tongue 21.

The egg may then rest on the bottom 23 and will be held in position by the spring action of the tongues of both sheets. When the braces 16 enter the slits 12 of the tongues 21, it tends to form a more rigid construction so that if pressure is exerted there is less tendency for the box to crush than if these parts were not locked together in the manner stated. Another feature to which I desire to call attention is the fact that the box is so arranged that it may be folded or collapsed as shown in Figure 8 and that a slight pressure on the opposite sides of the box will cause it to move into position for use.

In order to retain the cover 20 in position, I provide the tabs 24, which may be passed through the slits 25, as shown in Figures 1 and 2, thereby holding the cover securely in position.

I claim:

1. An egg holder, comprising an upper sheet having slits arranged to form tongues therein, said tongues having slits extending inwardly from the edges thereof, a bottom, a central sheet disposed between the bottom and the upper sheet and having slits to form tongues, integral brace members carried by said central sheet adjacent to the bases of said tongues, the tongues of the central sheet being in registration with the tongues of the upper sheet and the slits of the tongues in the upper sheet being arranged to receive said brace members when said slitted tongues are forced downwardly by the insertion of eggs in the openings left by the tongues.

2. An egg holder, comprising an upper sheet having a series of slits to form integral tongues connected at their bases with said sheet, a bottom, a central sheet disposed in parallel relation with said upper sheet and having slits to form pairs of oppositely projected tongues, the tongues of each pair being in registration with one of the tongues of the upper sheet, and integral brace members carried by said central sheet at the edges of the openings formed by the tongues, the tongues of the upper sheet having a slit on each side thereof arranged to receive one of said brace members when the tongue is bent downwardly by the insertion of an egg into the registering openings of the upper and the central sheets.

3. An egg holder, comprising an upper sheet having a series of slits to form integral tongues connected at their bases with said sheet, a bottom, a central sheet disposed in parallel relation with said upper sheet and having slits to form pairs of oppositely projected tongues, the tongues of each pair being in registration with one of the tongues of the upper sheet, integral brace members carried by said central sheet at the edges of the openings formed by the tongues, the tongues of the upper sheet having a slit on each side thereof arranged to receive one of said brace members when the tongue is bent downwardly by the insertion of an egg into the registering openings of the upper and the central sheets, a cover, and means for locking the cover in position.

EDWARD ELLSWORTH PINKERTON.